Nov. 29, 1949  F. S. BATEMAN ET AL  2,489,256
HAYRAKE
Filed Aug. 1, 1942  3 Sheets-Sheet 1
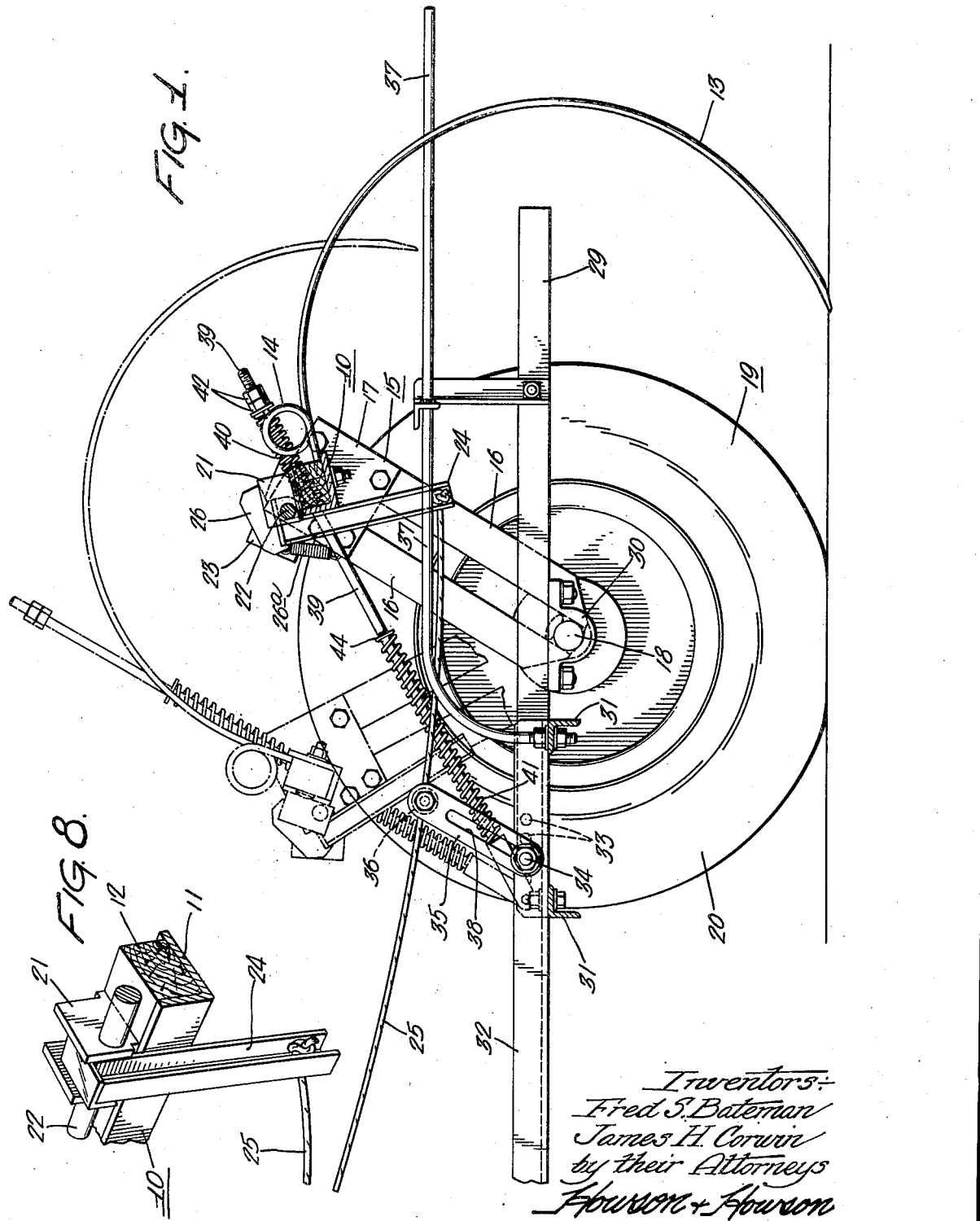
Inventors:
Fred S. Bateman
James H. Corwin
by their Attorneys
Howson & Howson Nov. 29, 1949  F. S. BATEMAN ET AL  2,489,256
HAYRAKE
Filed Aug. 1, 1942  3 Sheets-Sheet 2
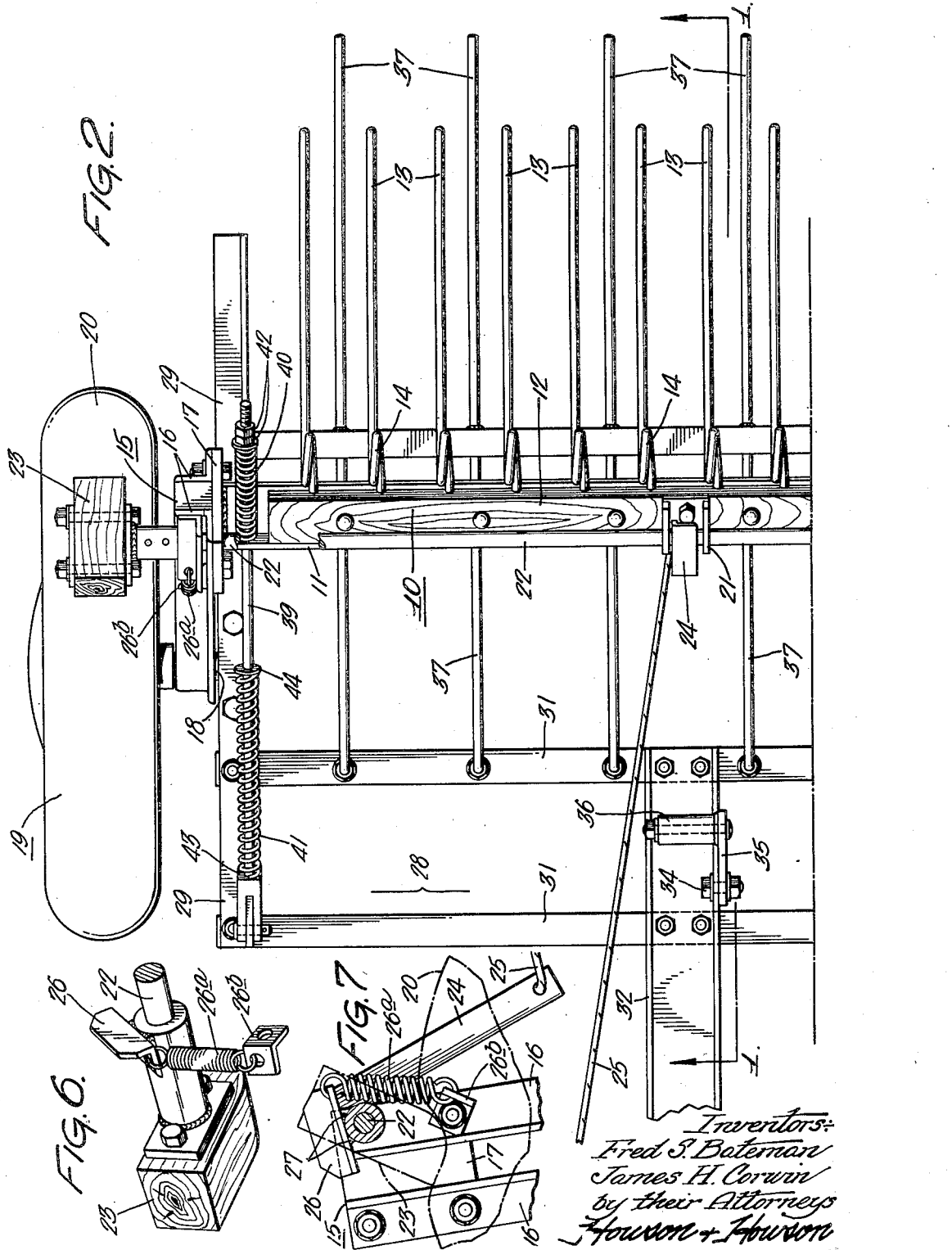
Inventors:
Fred S. Bateman
James H. Corwin
by their Attorneys
Howson + Howson Nov. 29, 1949  F. S. BATEMAN ET AL  2,489,256
HAYRAKE
Filed Aug. 1, 1942  3 Sheets-Sheet 3
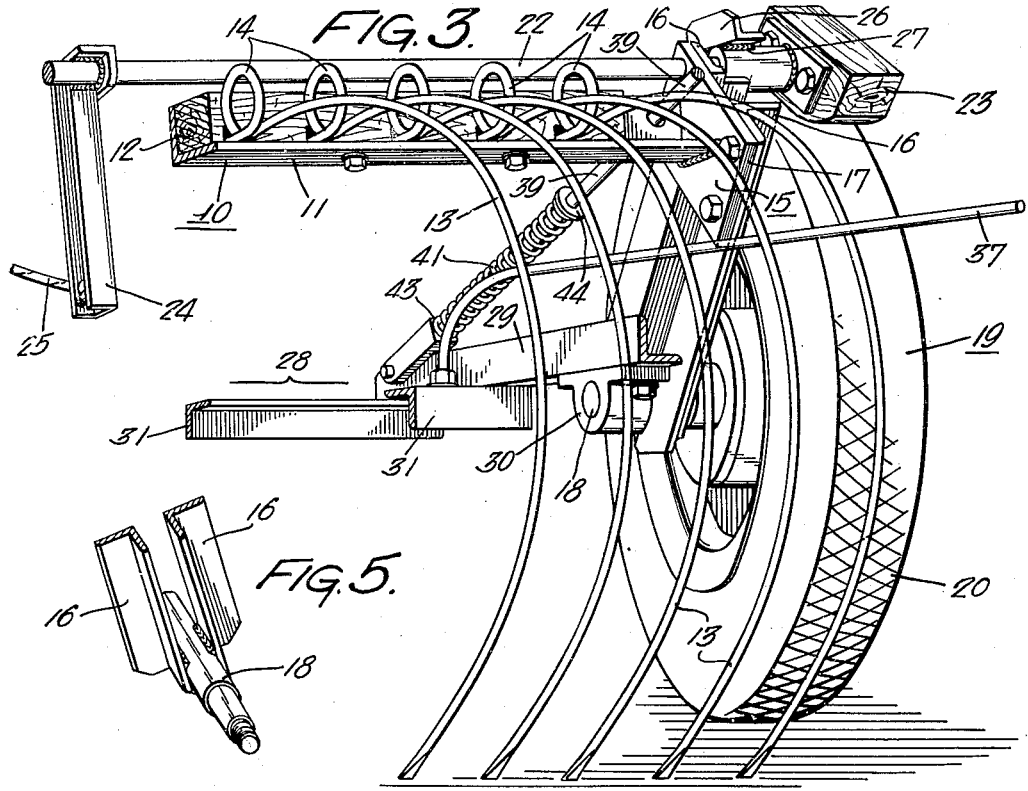
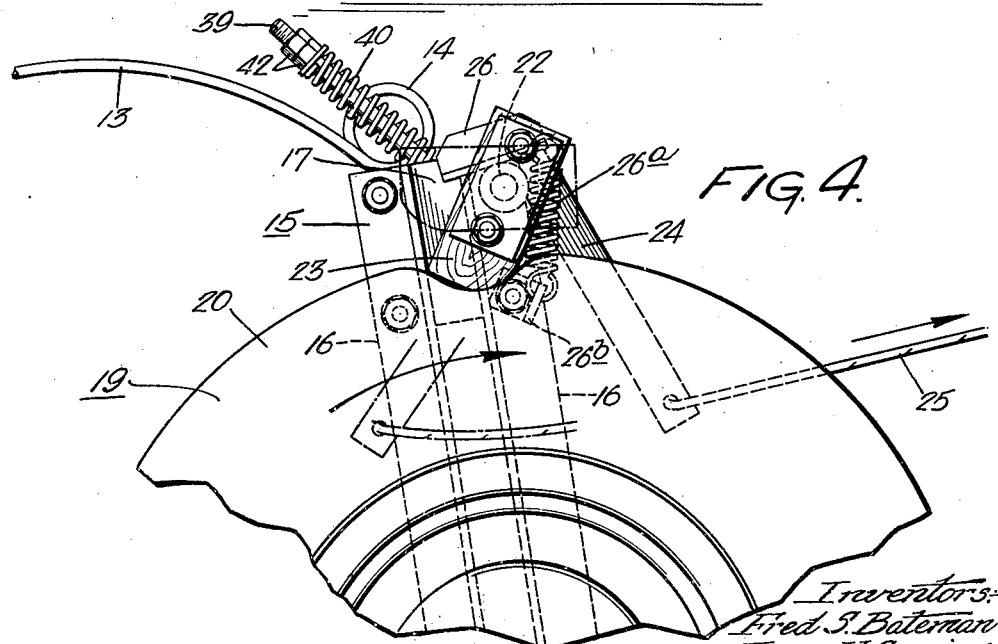

Patented Nov. 29, 1949

2,489,256

UNITED STATES PATENT OFFICE 2,489,256

HAYRAKE

Fred S. Bateman, Wayne, and James H. Corwin, Pottstown, Pa.; said Corwin assignor to said Bateman Application August 1, 1942, Serial No. 453,244

13 Claims. (Cl. 56—384)

This invention relates to hay rakes and more particularly to the construction of high speed hay rakes adapted for use as implements drawn by the present day tractor.

The hay rake, as previously employed, is unsuitable for use with tractors due to the fact that when tractor drawn, there must be some means for automatically dumping the rake, the ordinary hand pull being unsatisfactory at the relatively high speeds at which a tractor may be economically operated. While it has been heretofore proposed to utilize semi-automatic dumping means actuated from the wheels of the hay rake for dumping the rake, all such means with which we are familiar have been adapted to use with implements operating at very low speeds, as for example, two miles per hour, whereas the present invention contemplates construction of an apparatus which will operate at a speed of eight to ten miles per hour. In such prior devices, it was customary to use a pawl and ratchet mechanism for connecting the tine bar to the wheels so that the tines would be elevated and dump the accumulated load of hay. At the slow speeds at which such devices were intended to be used, such a mechanism is satisfactory, but with a mechanism operating at a relatively high speed, such as those above suggested, the shock upon the mechanism is such that the implement rapidly deteriorates and becomes an economic liability.

An important object of the present invention is the provision of a tractor drawn implement capable of operating at relatively high speeds and including a semi-automatic dumping mechanism in which there is employed a clutch having a relatively gradual application and in which, accordingly, the destructive shock upon the mechanism is materially reduced, if not entirely eliminated.

Another object of the invention is the provision of a hay rake which is so constructed that it may operate without "dribbling" over relatively rough territory and in which breakage and damage to the tines is materially reduced.

Another object of the invention is the provision of a structure which will materially reduce the over-all weight of the rake, as ordinarily constructed.

A still further object of the invention is the provision of a rake structure in which the rake, after the dumping operation, is rapidly and automatically returned to its raking position.

These and other objects we attain by the construction shown in the accompanying drawings wherein, for the purpose of illustration, we have shown a preferred embodiment of our invention and wherein:

Figure 1 is a central longitudinal sectional view through the hay rake in accordance with our invention taken on line 1—1 of Figure 2;

Figure 2 is a fragmentary plan view thereof;

Figure 3 is a fragmentary rear perspective of the rake;

Figure 4 is a fragmentary side elevation showing the rake and actuating mechanism in the dumping position in solid lines and in the normal operating position in dotted lines;

Figure 5 is a fragmentary perspective of the tine frame illustrating the mounting of the stub axles;

Figure 6 is a detail perspective illustrating the means for returning the clutch element to its normal position;

Figure 7 is a fragmentary elevation illustrating the method of limiting the movement of the hand operated clutch element; and Figure 8 is a fragmentary perspective of the hand-operated clutch element.

Referring now more particularly to the drawings, number 10 generally indicates a horizontal tine bar, at present shown as composed of an angle bar 11 against which the upper ends of the tines are seated and to which the tines are confined by means of a wooden filler strip 12. The tines 13 are of the usual construction, i. e., having adjacent their upper or attached ends a spring loop 14 affording flexibility and enabling the tines to pass over minor obstacles without damage. The tine frame additionally includes side members 15, each of which is at present disclosed as composed of a pair of parallel members 16 connected at their upper ends by means of plates 17, to one of which the associated end of the angle bar 11 is attached. Between the lower ends of the members 16 there is secured stub axles 18 upon which are rotatably mounted the supporting wheels 19, which as present illustrated are preferably equipped with pneumatic tires.

Mounted on bearings formed in the innermost of the plate 17 and in the central bearing 21 carried by the crossbar of the tine frame is a shaft 22, the outer ends of which are equipped with adjustable blocks 23 overlying and adapted for engagement with the pneumatic tires 20 of wheels 19. Since the structures at opposite ends of the machine are identical, only one thereof is herein shown and described. Secured to shaft 22 at the center is an arm 24, by means of which through a pull exerted from the tractor by means of line 25, the blocks 23 may be brought into engagement with an indent into the surface of the pneumatic tires, the present illustration of Figure 4 somewhat exaggerating the indentation taking place during the clutching action. Obviously, when the blocks 23 engage with and indent into the tires, relative rotation of the wheel and axle will cease and the tine frame will rotate with the wheel. It will also be obvious that the takeup action initiating motion of the tine frame will be gradual and similar in operation to the sine curve produced by an eccentric, thus eliminating abrupt shock upon the mechanism and enabling the head to be elevated with a smooth action less destructive than that resulting from the instantaneous engagement of a pawl and ratchet such as that hereinbefore discussed. The movement of the blocks 23, following their engagement with a movement by the tire 20 is positively limited by any suitable means. In the present instance, we have shown the shaft 22 as equipped at its ends with limiting blocks 26 welded to the shaft as at 27 and engaging against the upper end of one of the members 16 at the desired point, as more clearly shown in Figure 7. As a means for returning the blocks 23 and the shaft 22 to its normal position, springs 26a are connected between the stop elements 26 and brackets 26b secured to one of the side members 16 of the tine frame 10.

Associated with the tine frame 10 is a draw frame 28, which is at present illustrated as including a pair of side members 29, each of which is provided with a bearing 30 in which the axle is oscillatably mounted, and a pair of connecting transverse elements 31 to which the draw bar 32 is connected. This draw bar 32 is provided with a series of openings 33 for the selective reception of the securing element 34 by means of which a trip 35 is adjustably connected to the draw frame. This trip, as more clearly shown in Figure 2, includes a horizontally extended pivot upon which is mounted a roller 36, arranged in the path of arm 24 and against which this arm engages when the tine frame 10, moving under the compulsion of engagement of the blocks 23 with tires 20, has shifted the tines to a sufficient extent to enable the cleaner bars 37 to withdraw the collected load from the tines. Engagement of arm 24 with the trip releases the blocks 23 from the tire 20 enabling return of the tine bar and the tines to the working position, an operation which is facilitated in a manner hereinafter to be described. In addition to the adjustments of the trip 35 longitudinally of the draw bar hereinbefore discussed, this member is preferably longitudinally slotted as indicated at 38 to permit vertical adjustment thereof.

Pivotally connected to the parallel side members 29 of the draw frame 28, at the forward ends thereof are a pair of bars 39 which project through openings formed in the angle bar 11 and are equipped at opposite sides of the angle bar with springs 40 and 41. The spring 40 comes into play when the tine bar is in its working position, being at that time partially compressed and exerting a tension against the tine bar which may be regulated as by means of locknuts, indicated at 42. This spring is engaged by the channel bar when the side members 15 of the tine frame incline upwardly and rearwardly from the stub axle and the free ends of the tines are in proper engagement with the ground. These springs will serve, when passing over rough ground or when any serious obstruction is met with, to enable the entire tine frame to shift upwardly and forwardly, thus lifting the tines off the ground, but are of such order that they will not serve to elevate the tines completely from the ground. The result is that the tines will follow ground contours and there will be no "dribble" of the hay during working or collecting periods. The springs 41 are normally inactive, resting against a lower seat 43 formed upon the pivotal connection of the bar to the side element 29 and supporting at their upper ends a washer 44 or some abutment by means of which the spring may be properly compressed when the angle bar 11 comes into engagement therewith.

Due to the fact that the tine frame normally inclines upwardly and rearwardly from the stub axles, there will, of course, be a constant tendency of this frame to swing downwardly and rearwardly toward the ground and, accordingly, a constant tendency on the part of the tine frame to apply pressure to the tines. This pressure is regulated by the springs 40, the tension and position of which may be regulated through the adjusting mechanism at 42. It is therefore possible to very closely regulate the pressure with which the tines engage the ground. Obviously, the pressure of such engagement will act not only to prevent disengagement of the tines from the ground and, accordingly, to insure raking without "dribbling," but likewise to insure against such an engagement as would be likely to cause damage in the event of passage of the rake over rough territory, as for example, when raking cornstalks.

In the course of a normal dumping operation, as the tine frame moves forwardly under the influence of the clutching action between the blocks 23 and tires 20, the springs 41 will be compressed, as indicated in dotted lines in Figure 1 and will accordingly act when the clutching engagement is terminated to "kick" the tine frame rearwardly into its normal or working position and the final motion of the tine frame to its working position is cushioned by the supporting springs 40.

It will be obvious from the foregoing that a rake constructed in accordance with our invention may be made of extremely light construction, will operate to cleanly rake the area during the times when it is in working position and may be very readily actuated to its dumping position without imparting any severe shocks to the structure. In tests of apparatus of this character, it has been found that a very light pull upon the actuating element 25 will suffice to initiate actuation of the clutch since the friction between the blocks 23 and the tires 20 will ordinarily insure a continuation of the clutching movement.

Since the construction illustrated is obviously capable of considerable modification without departing from the spirit of our invention, we do not wish to be understood as limiting ourselves except as hereafter claimed.

We claim:

1. In a rake of the type described, an arched tine frame comprising a cross member bearing tines and side members bearing stub axles, supporting wheels on said stub axles, a draw frame pivoted to said tine frame, said tine frame normally inclining upwardly and rearwardly from the stub axles, means including cushioning springs interposed between the draw frame and the tine frame and resiliently opposing rearward movement of the tine frame for counterbalancing a substantial part of the weight of the tine frame when in the said normal position, means to swing the tine frame forwardly about said stub axles through a predetermined arc and springs interposed between the draw frame and tine frame and resiliently opposing said forward movement of the tine frame.

2. In a rake of the type described, an arched tine frame comprising a cross member bearing tines and side members bearing stub axles, supporting wheels rotatably mounted on said stub axles, an oscillatory rod carried by said tine frame and having at its ends blocks for engagement with the periphery of said supporting wheels, said blocks and supporting wheels being relatively compressible and the initial engagement of the blocks occurring at a point spaced circumferentially of the wheels from the oscillatory rod at that side of the rod such that following a clutch engaging movement of the rod, said blocks and wheels have frictional engagement with one another compelling further oscillatory movement of the blocks following such initial engagement, means to limit oscillatory movement of the blocks under such frictional engagement, means to oscillate the rod to cause initial engagement of the blocks with the wheels, means to disengage the blocks from the wheels following a predetermined oscillation of the tine frame with the wheels, and means to positively return the tine frame to a normal position in which the tines are in a hay gathering relation to the ground, the last named means comprising a draw frame oscillatably connected with the tine frame and springs interposed between said frames and resiliently opposing oscillation of the tine frame in response to clutching engagement between said blocks and wheels.

3. A device as claimed in claim 1 wherein, a bar is pivoted to the draw frame forwardly of the pivoted connection of the tine and draw frames and is extended through an opening in the cross member, and the first and last named springs are mounted on said bar at opposite sides of the cross member.

4. In combination, a portable structure including supporting wheels, a movable frame carried thereby and supporting implements shifted by oscillatory movement of the frame into and out of operative position, a clutch to connect said frame with at least one of said wheels to cause movement of the frame in one direction, said clutch comprising an oscillatory cam member, a pivotal support for said cam member about which the cam may be oscillated to bring it into engagement with the wheel and to release it from said engagement, the direction of oscillation and the contour of the cam member being such that the primary frictional engagement of the said member with the wheel institutes a further angular movement of the member about the pivotal support with a constantly increasing pressure engagement between the cam member and the wheel, means to turn the cam member on its pivot to cause said primary engagement thereof with the wheel member to cause primary engagement thereof with the wheel, means to limit the extent of the oscillatory movement of the cam member, means to thereafter disengage the cam member from the wheel, and an operative connection between the frame and cam member whereby said frame is shifted in response to movements of the member resulting from its frictional engagement with the wheel.

5. A device as claimed in claim 4 in which one of the oscillatory member and wheel has a compressible surface for engagement with the other thereof.

6. A device as claimed in claim 4 wherein the oscillatory member is of substantially rigid construction and the periphery of the wheel comprises a pneumatic tire.

7. In combination, a portable structure including supporting wheels, a movable frame carried thereby and supporting implements shifted by oscillatory movement of the frame into and out of operative position, a clutch to connect said frame with at least one of said wheels to cause oscillation of the frame in one direction, said clutch comprising an oscillatory cam element engaging the wheel periphery and so contoured that after primary engagement therewith it has frictional coaction therewith causing oscillation of the camming element in a direction to increase the gripping between the camming element and wheel, means to engage the camming element with the wheel, means to limit the oscillation of the camming element, and means to release the camming element from the wheel after a predetermined oscillation of the implement frame.

8. A device as claimed in claim 7 in which one of the camming element and wheel has a compressible surface for engagement with the other.

9. A device as claimed in claim 7 wherein the cam is of substantially rigid construction and the periphery of the wheel comprises a pneumatic tire.

10. In a rake of the type described, an arched tine frame comprising a cross member bearing tines and side members bearing stub axles, supporting wheels on said stub axles, a draw frame pivoted to said tine frame, said tine frame normally inclining upwardly and rearwardly from the stub axles, means including cushioning springs interposed between the draw frame and the tine frame and resiliently opposing rearward movement of the tine frame for counterbalancing a substantial part of the weight of the tine frame when in the said normal position, means including a clutch to swing the tine frame forwardly about said stub axles through a predetermined arc, springs interposed between the draw frame and tine frame and resiliently opposing said forward movement of the tine frame, and means to suddenly release the clutch and thereby free the tine frame for return movement upon the completion of the forward movement of the tine frame.

11. A device as claimed in claim 10 wherein a bar is pivoted to the draw frame forwardly of the pivoted connection of the tine and draw frames and is extended through an opening in the cross member, and the first and last named springs are mounted on said bar at opposite sides of the cross member.

12. In a rake of the type described, an arched tine frame comprising a cross member bearing tines and a side member bearing a stub axle, a supporting wheel rotatably mounted on said stub axle, an oscillatory rod carried by said tine frame and having at its end a block in proximity to the periphery of said supporting wheel so that said block may be brought into clutching engagement with said periphery by oscillation of the rod, means to limit oscillatory movement of the block by the wheel when so clutched to the latter whereby the tine frame is caused to rotate with the wheel, means to oscillate the rod to engage the block with the wheel, and means to disengage the block from the wheel following a predetermined oscillation of the tine frame with the wheel.

13. In a rake of the type described, an arched tine frame comprising a cross member bearing tines and a side member bearing a stub axle, a supporting wheel rotatably mounted on said stub axle, an oscillatory rod carried by said tine frame and having at its end a block in proximity to the periphery of said supporting wheel so that said block may be brought into clutching engagement with said periphery by oscillation of the rod, means to limit oscillatory movement of the block by the wheel when so clutched to the latter whereby the tine frame is caused to rotate with the wheel, means to oscillate the rod to engage the block with the wheel, means to disengage the block from the wheel following a predetermined oscillation of the tine frame with the wheel, and means to positively return the tine frame to a normal position in which the tines are in hay gathering relation to the ground.

FRED S. BATEMAN.
JAMES H. CORWIN.

REFERENCES CITED

The following references are of record in the file of this patent:

UNITED STATES PATENTS

| Number | Name | Date |
| --- | --- | --- |
| 166,708 | Lipe | Aug. 17, 1875 |
| 206,959 | Miller | Aug. 13, 1878 |
| 1,148,181 | Maw | July 27, 1915 |
| 2,026,112 | White | Dec. 31, 1935 |